(Model.)
J. B. MARQUIS.
DAIRY APPARATUS.
No. 265,843. Patented Oct. 10, 1882.
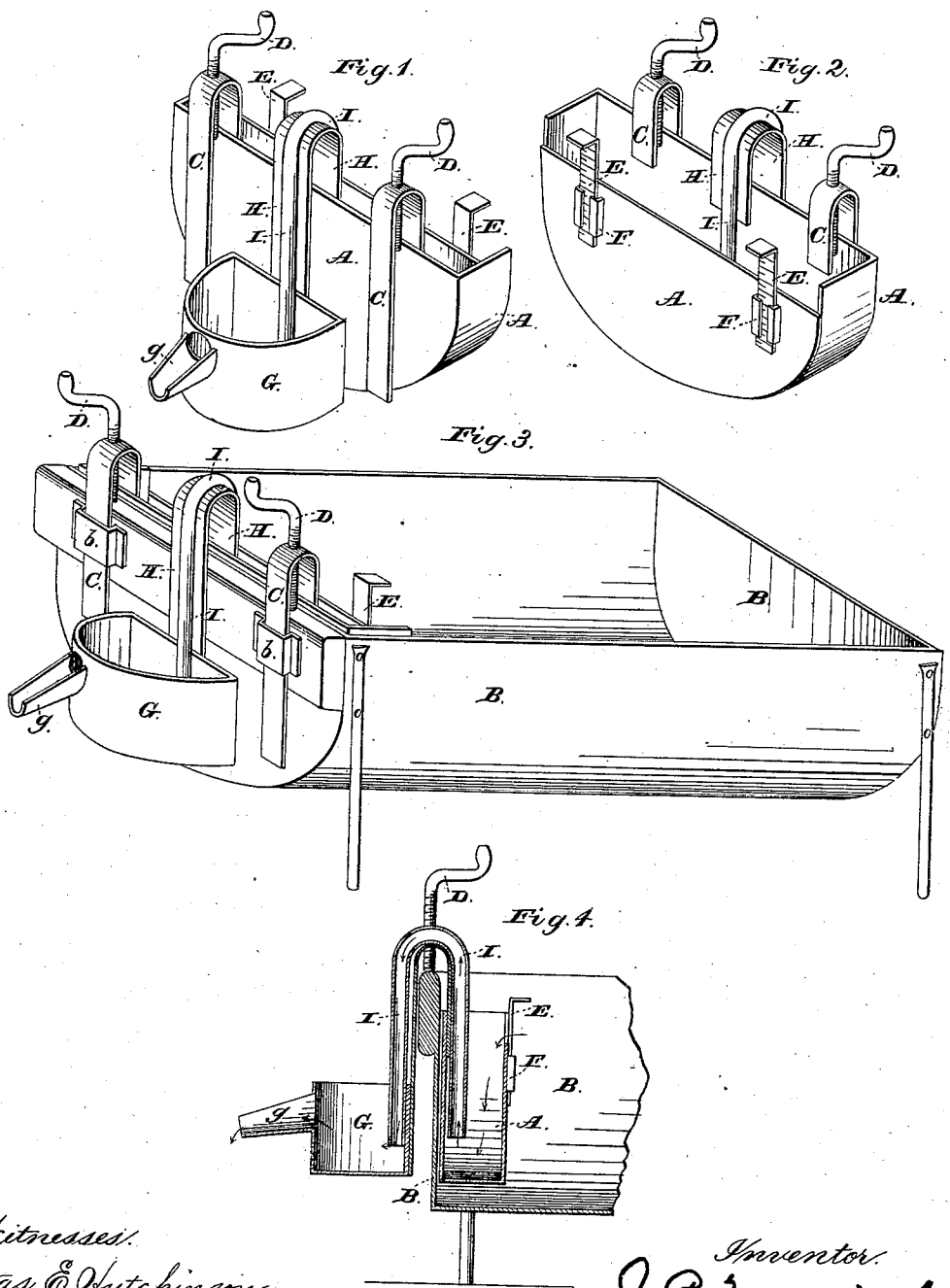
Witnesses:
Jas. E. Hutchinson.
Henry C. Hazard.
Inventor:
J. B. Marquis, by
Geo. S. Prindle, his Atty

UNITED STATES PATENT OFFICE.

JAMES B. MARQUIS, OF NORWICH, NEW YORK.

DAIRY APPARATUS.

SPECIFICATION forming part of Letters Patent No. 265,843, dated October 10, 1882.

Application filed April 29, 1881. (Model.)

*To all whom it may concern:*

Be it known that I, JAMES B. MARQUIS, of Norwich, in the county of Chenango, and in the State of New York, have invented certain new and useful Improvements in Dairy Apparatus; and I do hereby declare that the following is a full, clear, and exact description thereof, reference being had to the accompanying drawings, making a part of this specification, in which—

Figures 1 and 2 are perspective views of the front and rear sides respectively of my skimming apparatus separated from a milk-vat. Fig. 3 is a like view of the same in position for use, and Fig. 4 is a vertical section of said apparatus and vat upon a central longitudinal line.

Letters of like name and kind refer to like parts in each of the figures.

The design of my invention is to enable cream to be easily and quickly removed from the surface of milk without loss from waste, and without the removal or disturbance of said milk; and to this end it consists principally, as a means for removing cream from the surface of milk, in an apparatus composed of a gathering-vessel adapted to be placed within a milk-vat and adjusted until its upper edge is at the division-line between the milk and cream, a receiving-vessel placed outside of said vat, and a siphon extending between and connecting said vessel, whereby cream from said milk-vat will automatically flow into said gathering-vessel, and from the same through said siphon into said receiving-vessel, substantially as and for the purpose hereinafter specified.

It consists, further, in combining with a vessel adapted to be submerged within a milk-vat vertically-adjustable gages, whereby the position of the upper edge of said vessel with relation to the line of division between the milk and cream may be determined with certainty, substantially as and for the purpose hereinafter shown.

It consists, further, in a siphon which extends between and connects two vessels that have such relative vertical adjustment as to bring the upper edge of the lower vessel above the short inner arm of said siphon, and thereby prevent said siphon from being emptied of its liquid contents, substantially as and for the purpose hereinafter set forth.

It consists, finally, in the construction of the parts of my apparatus and their combination with each other, substantially as and for the purpose hereinafter shown and described.

In the annexed drawings, A represents a vessel which has such size and shape as to adapt it to fit into one end of a milk-vat, B, and to be capable of vertical adjustment therein until its top or one of its top edges is below the point to which the milk usually extends after cream has been removed from the same.

At or near each end of the vessel A is provided a bar, C, which extends upward above the top edge of the vat B, and from thence in a curve outward and downward, and has its outer arm contained in a sleeve or guide, b, that is formed upon or attached to said vat. The bars C operate to secure the vessel A in horizontal position, and also to guide the same when adjusted to vertical position, for which latter purpose a screw, D, passes downward through the curved upper end of each bar C, and at its lower end bears upon the upper edge of the end of the vat B, and by turning said screw in the necessary direction the vessel A will be raised or lowered with relation to said vat. The vessel A, thus combined with the vat B, is intended to be adjusted until its upper edge is just at the line of division between the cream and milk, when said cream, being wholly above said line, will flow into said vessel. I preferably make the inner side wall of said vessel lower than its outer side and end walls, so as to cause the cream to enter at the first-named point only.

In order that the vessel A may be readily adjusted to position, I attach near each end, upon its inner side wall, two gages, E, each of which is contained within a sleeve or guide, F, and is capable of vertical longitudinal adjustment thereon. One or both sides of each gage is provided with a scale, and its upper end is preferably bent horizontally outward.

When operating with the vessel A the depth of cream within the vat B and its distance below the top are first ascertained. The gages E are set with their upper ends at the precise distance above the lowest portion of the upper edge of said vessel that represents the thickness of said cream. The screws D are then approximately set to hold said vessel in substantially the correct position, after which the latter is lowered into said vat and the cream permitted to flow into said vessel. Should it prove that the edge of the vessel is not low enough to cause all of the cream to pass over the same, said vessel can be easily adjusted to the necessary depth; but under ordinary circumstances the first adjustment of the screws can be so accurately made as to require no further change.

Connected with the vessel A is a second receiving-vessel, G, which is located outside of the vat B, and is connected with said vessel A by means of one or more bars, H, that are secured to each vessel and extend over the end wall of said vat in the form of an inverted letter U. Said vessel G may be permanently secured to or upon said bar H, or it may be capable of vertical adjustment upon the same. Communication between the vessels A and G is effected by means of a siphon-tube, I, which passes over the end wall of the vat A, and has its short arm contained within said vessel A and its long arm within said vessel G. As cream flows into the inner vessel, A, it will pass into the vessel G, in accordance with the well-known law of nature.

In order that the siphon I may not be emptied of its liquid contents, so as to require to be charged each time that the apparatus is used, its outer end is slightly below the level of the overflow or discharge spout $g$ of the vessel G, and said overflow-point slightly above the inner end of said siphon, by which means said ends are sealed and the liquid contents of said siphon held in suspension.

This apparatus is capable of adjustment to any of the usual forms of milk-vats, and can be easily and quickly transferred from one to another and made to remove the cream from a large number of vats.

As the skimmed milk within the vat is undisturbed by the removal of cream, it can be immediately operated upon for the production of cheese, by which means said vat is enabled to perform a double office and the necessary machinery of a creamery is materially lessened in extent and cost.

Having thus fully set forth the nature and merits of my invention, what I claim as new is—

1. As a means for removing cream from the surface of milk, an apparatus composed of a gathering-vessel adapted to be placed within a milk-vat and adjusted until its upper edge is at the division-line between the milk and cream, a receiving-vessel placed outside of said vat, and a siphon extending between and connecting said vessels, whereby cream from said milk-vat will automatically flow into said gathering-vessel, and from the same through said siphon into said receiving-vessel, substantially as and for the purpose specified.

2. In combination with a vessel adapted to be submerged within a milk-vat, vertically-adjustable gages, whereby the position of the upper edge of said vessel with relation to the line of division between the milk and cream may be determined with certainty, substantially as and for the purpose shown.

3. A siphon which extends between and connects two vessels that have such relative vertical adjustment as to bring the upper edge of the lower vessel above the short inner arm of said siphon, and thereby prevent said siphon from being emptied of its liquid contents, substantially as and for the purpose set forth.

4. The hereinbefore-described apparatus for removing or skimming cream, consisting of the vessels A and G, connected by means of the bars H and siphon I, the guide-bars C, the adjusting-screws D, and the vertically-adjustable gages E, said parts being combined substantially as shown and adapted for attachment to a milk-vat, in the manner and for the purpose substantially as described.

In testimony that I claim the foregoing I have hereunto set my hand this 18th day of April, 1881.

JAMES BARRON MARQUIS.

Witnesses:
W. F. JENKS,
F. W. ROGERS.